United States Patent
Huber et al.

(10) Patent No.: US 10,041,555 B2
(45) Date of Patent: Aug. 7, 2018

(54) DISC BRAKE FOR A COMMERCIAL VEHICLE

(71) Applicant: KNORR-BREMSE Systeme fuer Nutzfahrzeuge GmbH, Munich (DE)

(72) Inventors: Stefan Huber, Aldersbach (DE); Michael Hidringer, Hofkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 23 days.

(21) Appl. No.: 15/214,984

(22) Filed: Jul. 20, 2016

(65) Prior Publication Data

US 2016/0327111 A1 Nov. 10, 2016

Related U.S. Application Data

(63) Continuation of application No. PCT/EP2015/050886, filed on Jan. 19, 2015.

(30) Foreign Application Priority Data

Jan. 20, 2014 (DE) .................. 10 2014 100 560

(51) Int. Cl.
*F16D 66/02* (2006.01)
*F16D 55/2265* (2006.01)

(52) U.S. Cl.
CPC ......... *F16D 66/02* (2013.01); *F16D 55/2265* (2013.01)

(58) Field of Classification Search
CPC .... F16D 66/02; F16D 55/2265; F16D 66/022; F16D 66/026; F16D 66/028
See application file for complete search history.

(56) References Cited

U.S. PATENT DOCUMENTS 4,279,214 A 7/1981 Thorn
4,776,438 A 10/1988 Schandelmeier
(Continued)

FOREIGN PATENT DOCUMENTS

CN 1696532 A 11/2005
CN 102105720 A 6/2011
(Continued)

OTHER PUBLICATIONS

International Preliminary Report on Patentability (PCT/IB/338 & PCT/IB/373) issued in PCT Application No. PCT/EP2015/050886, including English translation of Written Opinion (PCT/ISA/237) dated Aug. 4, 2016 (thirteen (13) pages).
(Continued)

*Primary Examiner* — Pamela Rodriguez
(74) *Attorney, Agent, or Firm* — Crowell & Moring LLP

(57) ABSTRACT

A disc brake has a brake caliper which straddled a brake disc and is mounted on a stationary brake carrier so as to be axially movable in relation to the brake disc. Brake pads which are placed in the brake caliper can be pressed against the brake disc by a brake application mechanism during a braking operation. In order to be axially movable, the brake caliper is mounted on at least one guide bar that is connected to the brake carrier. A device is provided for optically detecting wear of a brake disc and/or a brake pad. In order for wear to be detectable, a comparative element which runs parallel to the guide bar, extends away from brake disc, and includes at least one step, is mounted on the brake carrier.

11 Claims, 4 Drawing Sheets

(56) References Cited

U.S. PATENT DOCUMENTS

| | | | | |
|---|---|---|---|---|
| 6,237,723 B1* | 5/2001 | Salsman | ............... | F16D 66/00 |
| | | | | 188/1.11 W |
| 6,311,554 B1* | 11/2001 | Walpole | ............... | F16D 65/08 |
| | | | | 188/1.11 W |
| 6,460,659 B1* | 10/2002 | Schaffer | ............... | F16D 66/02 |
| | | | | 188/1.11 R |
| 8,752,678 B2 | 6/2014 | Gruber et al. | | |
| 9,732,815 B2* | 8/2017 | Goncalves | ............ | F16D 66/028 |
| 2003/0121732 A1* | 7/2003 | Miller | ................ | F16D 66/028 |
| | | | | 188/1.11 W |
| 2005/0252727 A1 | 11/2005 | England et al. | | |
| 2007/0012525 A1 | 1/2007 | Nechvatal | | |

FOREIGN PATENT DOCUMENTS

| | | |
|---|---|---|
| DE | 36 12 166 C2 | 5/1995 |
| DE | 601 09 332 T2 | 3/2006 |
| DE | 10 2008 034 653 A1 | 1/2010 |
| DE | 10 2009 025 875 A1 * | 12/2010 |
| EP | 1 456 556 B1 | 3/2005 |
| EP | 1 596 092 A1 | 11/2005 |
| GB | 2 383 826 A | 7/2003 |
| WO | WO 03/046404 A1 | 6/2003 |

OTHER PUBLICATIONS

International Search Report (PCT/ISA/210) issued in PCT Application No. PCT/EP2015/050886 dated Apr. 22, 2015, with English translation (four (4) pages).

German Office Action issued in counterpart German Application No. 10 2014 100 560.0 dated Mar. 9, 2015 (eight (8) pages).

Chinese-language Office Action issued in counterpart Chinese Application No. 201580010098.1 dated Dec. 6, 2017 with English translation (nine pages).

* cited by examiner

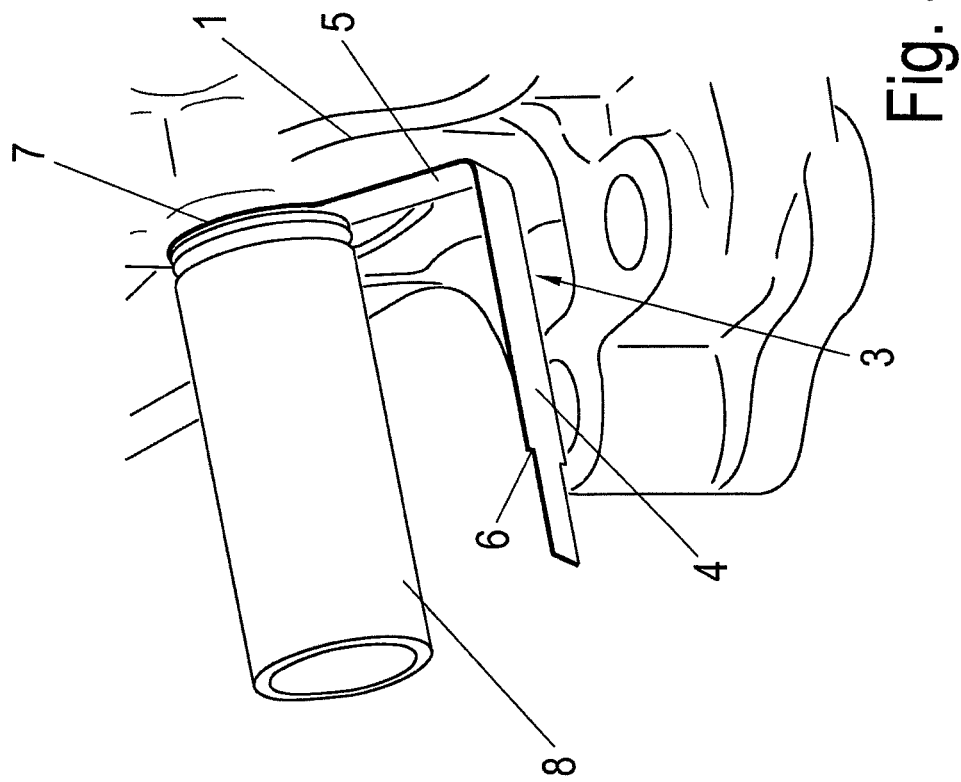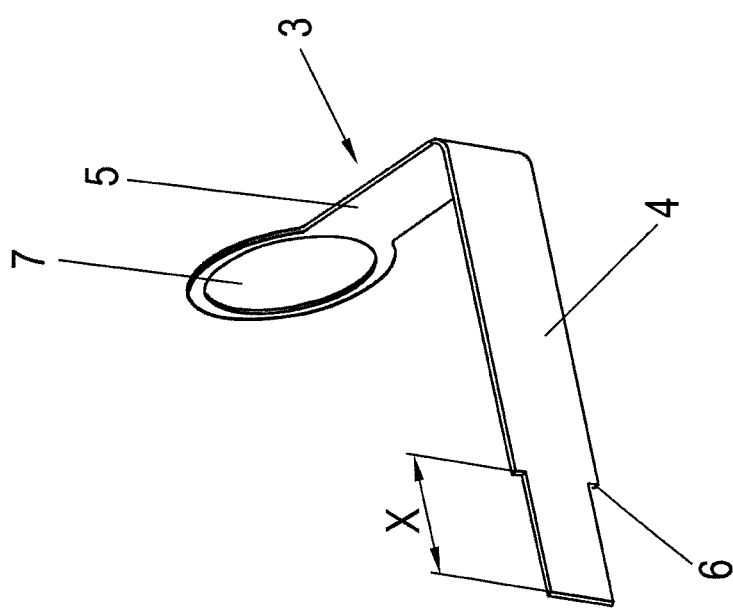

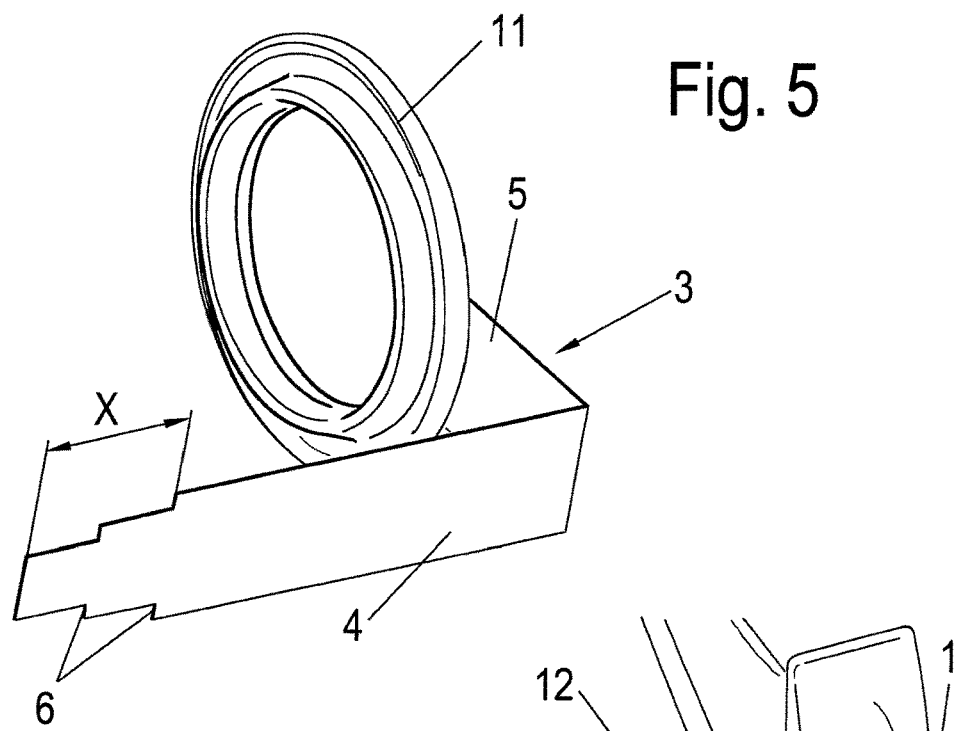
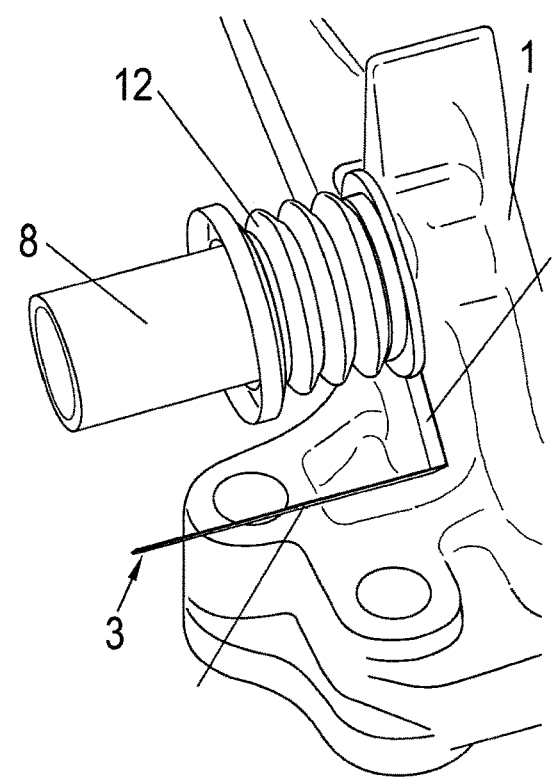
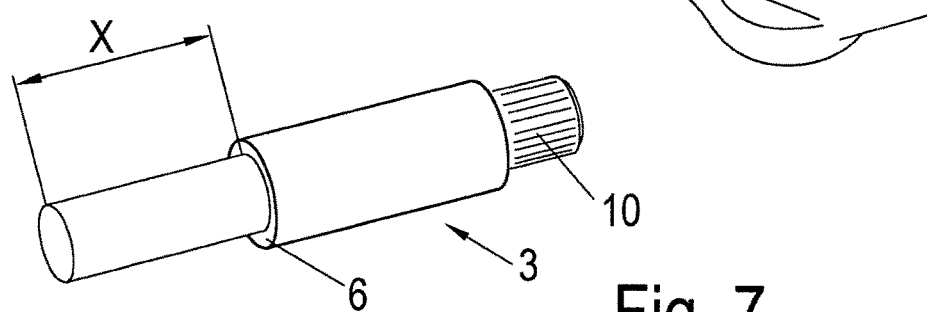

DISC BRAKE FOR A COMMERCIAL VEHICLE

CROSS REFERENCE TO RELATED APPLICATIONS

This application is a continuation of PCT International Application No. PCT/EP2015/050886, filed Jan. 19, 2015, which claims priority under 35 U.S.C. § 119 from German Patent Application No. 10 2014 100 560.0, filed Jan. 20, 2014, the entire disclosures of which are herein expressly incorporated by reference.

BACKGROUND AND SUMMARY OF THE INVENTION

The invention relates to a disc brake for a commercial vehicle.

Monitoring of the wear of the brake pads and/or the brake disc takes place, above all, for reasons of operational safety of a disc brake, with the result that a required replacement of the respective brake pad takes place at a best possible time. Here, the wear state of the brake pads is to be determined as accurately as possible in advance.

The replacement of the brake pads is required at an optimum time, in particular, for economic reasons. It is to be aimed for here that a replacement is carried out only when the respective friction pad has been used down to a permissible minimal thickness. A premature replacement would be contrary to the optimization of the operating costs in this regard, whereas a replacement which is too late would entail an impairment of the functional safety of the disc brake overall.

Various structural solutions are known for detecting the wear state of the brake pads. For instance, a wear indicator is used, in which a current-conducting cable is guided through the pad carrier plate, which cable is severed in the case of wear of the friction pad and generates a signal in a signal generator, usually in the driver's cab of the motor vehicle.

Furthermore, wear indicators are known which, by means of a rotary potentiometer, determine a movement travel of an adjusting device which results in the case of an adjustment of the brake pads in order to compensate for a wear stroke, which movement travel can likewise be seen, for example by the driver of the vehicle, by way of a display device.

For example, a device which has a spring-loaded pin which is guided in the brake caliper and by way of which a wear-induced adjustment of the brake caliper can be seen is used for visually detecting the wear state of the brake pads, in accordance with the characterizing type.

However, the realization of a wear indicator of this type is associated with considerable structural complexity, just like the realization of the remaining known wear indicators. For example, complicated machining of the brake caliper is required in order to guide the pin.

The electric wear indicators can likewise be implemented only with considerable apparatus complexity and, moreover, cannot ensure absolutely reliable functioning, on account of the severe operating conditions in which commercial vehicles are frequently used.

DE 36 12 166 C2 proposes providing the brake carrier with a marking for visual detection of the wear state of the brake pads and/or the brake disc, which marking serves for wear detection in correspondence with a correspondingly modified pad carrier plate.

Here, the brake carrier-side markings are produced by way of a corresponding shape, in particular by way of U-shaped or V-shaped recesses in the sense of notches.

However, recesses of this type, and also other necessary shapes, have an influence on the strength of the brake carrier, the notches, above all, leading to a reduction in the fatigue fracture strength.

A common feature of all devices for wear detection is that they can be seen substantially only when the vehicle wheel is removed, which prevents an optimized use of the device.

The invention is based on the object of developing a disc brake of the generic type in such a way that a simple, reliable and accurate wear indicator of the brake pad is possible with low structural and manufacturing complexity.

This object is achieved by way of a disc brake having a brake caliper which engages over a brake disc, is held on a stationary brake carrier such that it can be displaced axially in relation to the brake disc, and in which brake pads are positioned which can be pressed against the brake disc by way of a brake application device during a braking operation. The brake caliper is mounted for axial displacement on at least one guide bar which is connected to the brake carrier. A device for visual wear detection of brake disc and/or brake pad wear is provided, wherein, for wear detection, a comparison element which runs parallel to the guide bar, extends in the opposite direction to the brake disc and has at least one step is fastened to the brake carrier.

A comparison element which is fastened according to the invention to the brake carrier, extends parallel to the guide bar of the brake carrier, is oriented in the opposite direction to the brake disc, and has a step, is particularly simple and inexpensive to manufacture and to assemble. This results in a significant cost reduction, in comparison with the above-mentioned wear contacts or continuous wear sensing by way of the above-described potentiometer.

All deformations of the comparison element, such as notched portions, stamped recesses, grooves, notches or the like, are to be considered to be a step in the broadest sense.

The arrangement of the comparison element so as to run in the opposite direction to the brake disc permits wear detection without it being necessary for the vehicle wheel to be removed.

The visual recognizability of the wear state is assisted by way of the step which, in correspondence with an edge of the brake caliper, makes it possible to detect that the minimum permissible thickness of the friction pad has been reached, said edge and the step being aligned visually.

In order to establish a visual distinction here, that is to say in order for it to be possible to detect the wear state even in the case of unfavorable light conditions, the step, just like the edge of the brake caliper, can be marked in color.

Since the comparison element is provided as a separate component, a change of the brake carrier and/or other components of the disc brake is no longer required.

According to one advantageous development of the invention, the comparison element consists of an angled-away metal sheet which is clamped in between the guide bar and the brake carrier, to which end an eyelet is integrally formed on the comparison element, which eyelet is penetrated by the shank of a screw, by way of which the guide bar is fastened to the brake carrier.

According to another variant of the invention, the comparison element is arranged between a ring of a folding bellows and the brake carrier, the ring of the folding bellows being supported on the eyelet. The folding bellows serves to protect the guide bar in the region which lies exposed between the brake caliper and the brake carrier.

According to a further concept of the invention, the comparison element is configured as a pin which is pressed into an eye of the brake carrier and is held in a frictionally locking manner therein.

The comparison element is extremely simple to manufacture in every form, whether as a sheet metal strip or as a pin, as a turned part (pin) or as a bar/formed part (sheet metal strip). In contrast to electric wear detection, as described with respect to the prior art with a contact conductor which is embedded in the friction pad, the novel wear detection means does not cause any abrasion during operation, with the result that the invention also affords corresponding advantages for environmental protection reasons.

In addition to the particularly inexpensive manufacturing capability, the in principle universal applicability is to be emphasized. In particular, retrofitting of a disc brake which has already been assembled is possible without a problem, the comparison element being configured in such a way that it can be mounted on the brake carrier both on one side and on the other side in the connector region of the brake caliper. In this case, two guide bars are provided, of which one is a constituent part of a locating bearing and the other is a constituent part of a floating bearing. The possibility of clamping the comparison element between the guide bar or between the folding bellows and the pad carrier may be suitable here.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a detail of the disc brake in a perspective view;

FIGS. 3 and 4A and 4B show the detail according to FIG. 2 in a mounted position, in each case likewise shown perspectively;

FIG. 5 shows a further exemplary embodiment of a detail of the disc brake in a diagrammatic illustration;

FIG. 6 shows the detail according to FIG. 5 in a mounted position; and

FIG. 7 shows a further exemplary embodiment of the invention, illustrated as a detail.

DETAILED DESCRIPTION OF THE DRAWINGS

Figure 1:
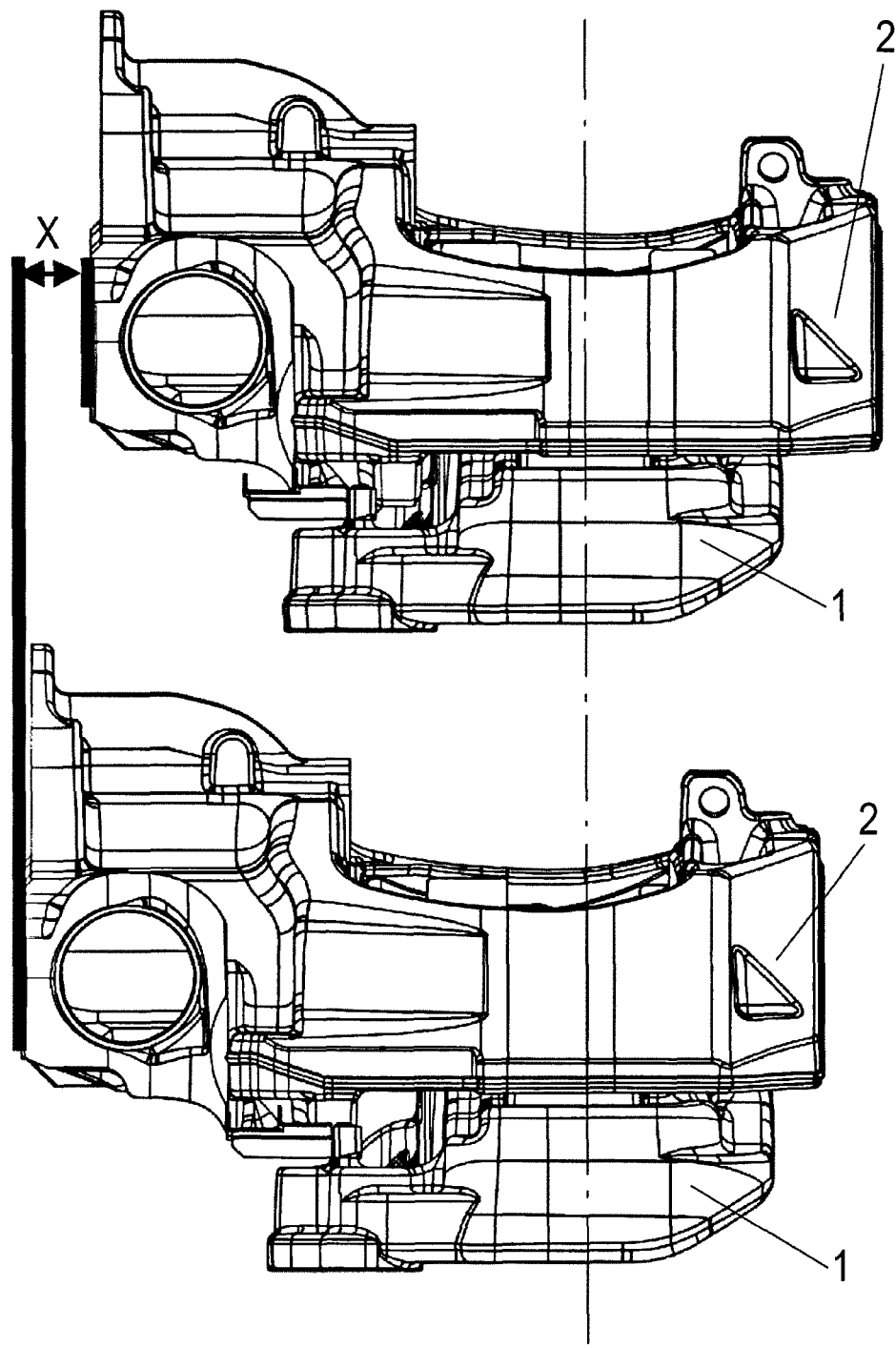
FIG. 1 shows part of a disc brake according to the invention in different, wear-induced positions.

FIG. 1 shows a brake caliper 2 of a disc brake, which brake caliper 2 is fastened to a vehicle-side brake carrier 1 and engages over a brake disc (not shown). The brake caliper 2 is held on the brake carrier 1 such that it can be displaced axially in relation to the brake disc, guide bars 8 (FIG. 3) which are connected to the brake carrier 1 being provided to this end.

Two brake pads (likewise not shown) which can be pressed against the brake disc by means of a brake application device during a braking operation are arranged in the brake caliper 2 and in the brake carrier 1. Each brake pad consists of a pad carrier plate and a friction pad which makes contact with the brake disc in the case of a braking operation.

Said friction pad but also the brake disc are subject to wear in the sense of abrasion, as a result of which the position of the brake caliper 2 changes with respect to the brake carrier 1. This wear amount is denoted by X in FIG. 1, the upper depiction representing the position of the brake caliper 2 with unworn brake pads and the lower depiction representing brake pads which are abraded down to a minimum thickness.

A wear detection device is provided for checking the wear, in particular, however, for detecting a permissible wear limit, which wear detection device consists, according to the invention, of an elongate comparison element 3, with at least one step 6. A comparison element 3 of this type is shown in various design variants in FIGS. 2-7.

A common feature of them all is that the comparison element 3 runs parallel to the guide bar 8 and extends in the opposite direction to the brake disc.

The step 6 is provided at a distance from the free end of the comparison element 3, which distance corresponds to the maximum permissible wear amount X.

In FIGS. 2-4, the comparison element 3 is configured as an angled-away strip, with two limbs 4, 5 which lie at an angle with respect to one another, the limb 4 extending parallel to the guide bar 8, whereas the limb 5 has an eyelet 7 on the end side for the passage of a threaded pin, by way of which the guide bar 8 is fastened to the brake carrier 1. In this way, the comparison element 3 is clamped in between the brake carrier 1 and the guide bar 8.

Figure 4B:
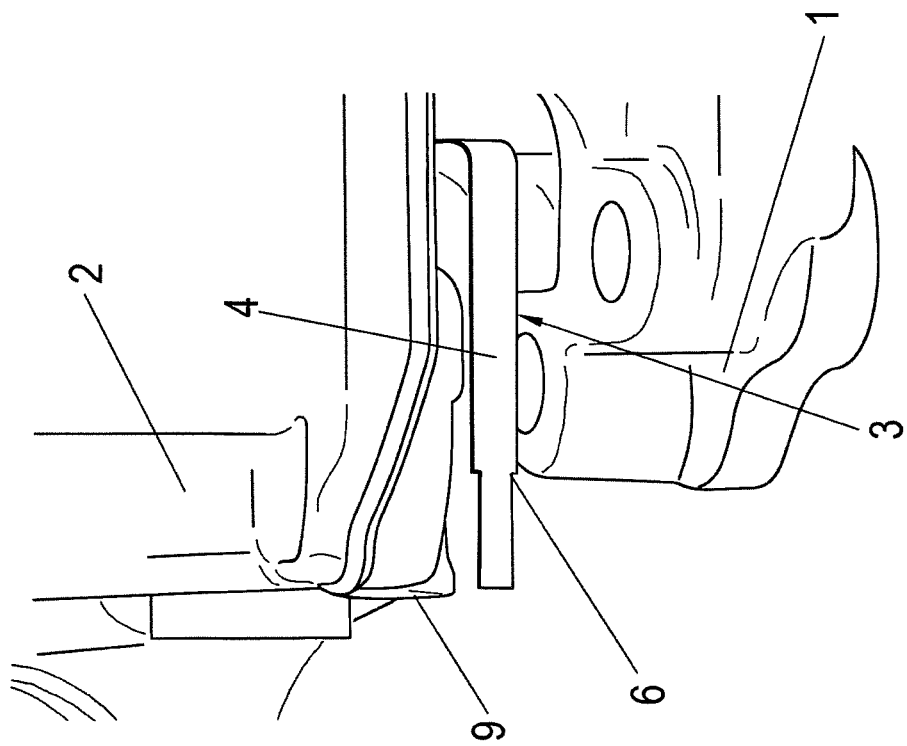
Figure 4A:
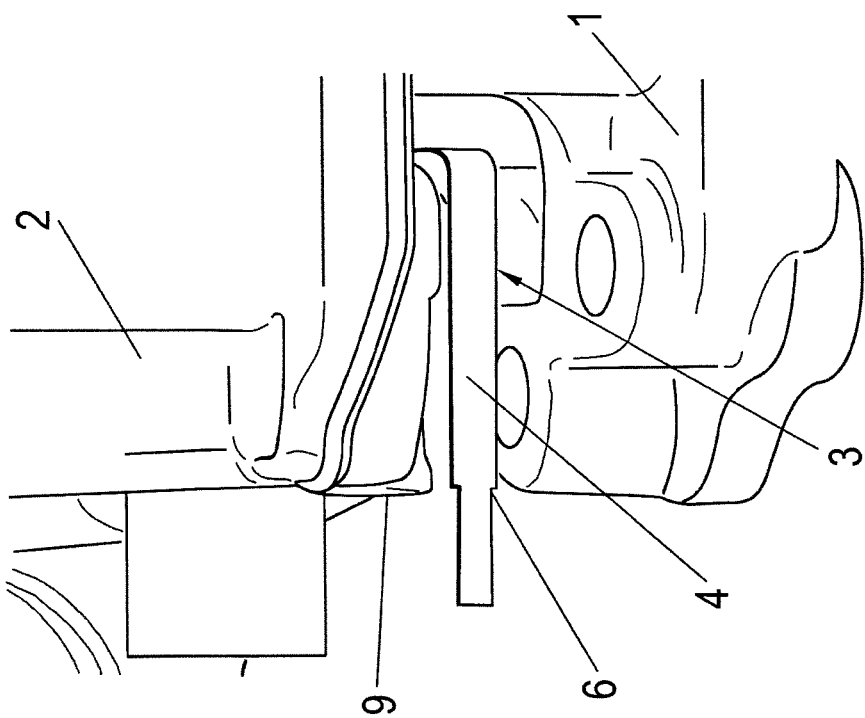

In FIGS. 4a) and 4b), the comparison element 3 can be seen in relation to the different positions of the brake caliper 2 before and after a wear-induced displacement.

Here, FIG. 4b) illustrates the position which the brake caliper 2 assumes when a permissible wear amount of the brake pads is reached, in which position an edge 9 of the brake caliper 2 is visually aligned with the free end of the limb 4.

FIG. 4a) illustrates the position of the brake caliper 2 in which the brake pads are not yet used in the sense of abrasion. Here, the edge 9 is aligned with the step 6, which can be seen readily and clearly from the outside by an observer.

The design variant of the comparison element 3 according to FIGS. 5 and 6 represents a comparable construction, the comparison element 3 also being configured here as a sheet metal strip, at the free end of the limb 4 of which two steps 6 are provided, the last step 6 corresponding to the maximum permissible wear amount X.

The other, angled-away limb 5 is configured on the end side as a ring 11 which is clamped in between bellows 12 (FIG. 6) and the brake carrier 1.

The steps 6 according to FIGS. 2-6 are present as notched portions of the limb 4. As an alternative, stamped recesses, notches, grooves or comparable deformations are contemplated.

Finally, FIG. 7 shows a comparison element 3 as a detail, which comparison element 3 consists of a pin which is pressed into an eye of the brake carrier 1, to which end a locating pin 10 is integrally formed at one end, with grooving, in order to achieve secure, frictionally locking retention in said eye.

The step 6 is provided so as to lie opposite this, which step 6 is formed by way of a reduction in the diameter at the spacing X from the end, and which step 6 can likewise be configured optionally as a stamped recess, notch, groove or the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a brake disc, comprising:
a caliper configured to engage over the brake disc;
a stationary brake carrier on which the caliper is axially displaceable relative to the brake disc so as to press brake pads against the brake disc during a brake operation;
at least one guide bar on which the caliper is mounted for axial displacement, the guide bar being connected to the stationary brake carrier;
a visual wear detection device configured for detection of brake disc and/or brake pad wear, the visual wear detection device comprising a comparison element arranged parallel to the guide bar, extending in an opposite direction to the brake disc, having at least one step, and being fastened to the brake carrier at a region where the guide bar connects to the brake carrier,
wherein the step is arranged at a spacing from a free end of the comparison element, which spacing corresponds to a maximum permissible wear amount.

2. The disc brake as claimed in claim 1, wherein the comparison element is configured as an angled-away sheet metal strip.

3. The disc brake as claimed in claim 1, wherein the step is provided at a free end of a limb parallel to the guide bar, and a free end of another angled-away limb is designed as an eyelet or ring.

4. The disc brake as claimed in claim 3, wherein the comparison element is clamped in the region of the eyelet between the guide bar and the brake carrier.

5. The disc brake as claimed in claim 1, wherein the comparison element is fastened by way of an integrally formed ring to a folding bellows which encloses the guide bar in a space which is formed between the brake caliper and the brake carrier.

6. The disc brake as claimed in claim 1, wherein the comparison element is of pin-shaped configuration and is pressed into the brake carrier.

7. The disc brake as claimed in claim 6, wherein, on a side which lies opposite the step, the pin-shaped comparison element is configured as a locating pin with a profiled circumferential face.

8. The disc brake as claimed in claim 6, wherein the pin-shaped comparison element is rotationally symmetrical.

9. The disc brake as claimed in claim 1, wherein the step and/or a comparison surface of the brake caliper which corresponds visually therewith are/is color coded.

10. The disc brake as claimed in claim 1, wherein the step is configured as a notched portion, a stamped recess, a notch or a groove.

11. The disc brake as claimed in claim 1, further comprising:
a second guide bar on which the caliper is mounted for axial displacement, the second guide bar being also connected to the stationary brake carrier, wherein the one guide bar is a constituent part of a fixed bearing and the second guide bar is a constituent part of a floating bearing;
a second comparison element arranged parallel to the second guide bar, extending in an opposite direction to the brake disc, having at least one step, and being fastened to the brake carrier, wherein the step of the second comparison element is arranged at a spacing from a free end of the second comparison element, which spacing also corresponds to a maximum permissible wear amount.

* * * * *